United States Patent [19]

Hsu

[11] Patent Number: 5,954,355
[45] Date of Patent: Sep. 21, 1999

[54] SHOCK-ABSORBING STRUCTURE OF BICYCLE FRONT FORK

[76] Inventor: Tzu-Sun Hsu, 1-475, Kao Mei Road, Ching Swei Township, Taichung Hsien, Taiwan

[21] Appl. No.: 08/940,281

[22] Filed: Sep. 30, 1997

[51] Int. Cl.⁶ ..................................................... B62K 3/02
[52] U.S. Cl. ......................... 280/276; 280/279; 403/377; 403/DIG. 7
[58] Field of Search .................................. 280/276, 275, 280/279; 403/327, 377, DIG. 7; 74/492, 551.1, 551.8

[56] References Cited

U.S. PATENT DOCUMENTS

| | | | |
|---|---|---|---|
| 1,134,179 | 4/1915 | Boyd | 403/377 |
| 2,140,644 | 12/1938 | McHugh | 403/377 |
| 3,515,418 | 6/1970 | Nielsen | 403/377 |
| 3,984,119 | 10/1976 | Okazima | 280/276 |
| 5,301,974 | 4/1994 | Knapp | 280/276 |
| 5,344,170 | 9/1994 | Ochoa | 280/283 |
| 5,382,037 | 1/1995 | Chang et al. | 280/276 |
| 5,449,188 | 9/1995 | Ohma | 280/276 |
| 5,464,300 | 11/1995 | Crainich | 403/322 |
| 5,647,684 | 7/1997 | Chen | 403/370 |
| 5,737,974 | 4/1998 | Chen | 74/551.1 |

FOREIGN PATENT DOCUMENTS 1103855  11/1955  France ................................. 280/276

*Primary Examiner*—Lanna Mai
*Assistant Examiner*—Michael Cuff
*Attorney, Agent, or Firm*—Harrison & Egbert

[57] ABSTRACT

A bicycle front fork having two upper fork tubes, two lower fork tubes, and two fitting members connecting the upper fork tubes and the lower fork tubes. The upper fork tubes are provided respectively in the midsection thereof with a projection. The fitting members are provided respectively in the inner wall thereof with a slide slot in which the projection of the upper fork tube is slidably engaged to provide the upper fork tube with a shock-absorbing effect. The fitting members are provided respectively in the outer wall thereof with a protruded block. The lower fork tubes are provided respectively with a stopping ring edge having a groove corresponding in location to the protruded block of the fitting members. The fitting members and the lower fork tubes are fastened by a C-shaped ring.

5 Claims, 10 Drawing Sheets

5,954,355

SHOCK-ABSORBING STRUCTURE OF BICYCLE FRONT FORK

FIELD OF THE INVENTION

The present invention relates generally to a bicycle front fork, and more particularly to a shock-absorbing structure of the bicycle front fork.

BACKGROUND OF THE INVENTION

As shown in FIG. 1, the upper fork tubes 11 of the conventional bicycle shock-absorbing front fork main body 10 are fitted into the lower fork tubes 12, which are provided with a shaft support rod 13 for pivoting an arm-holding member 15 which has a brake shoe 14 and is capable of being actuated by a brake cable 17. The shaft support rod 13 serves as a fulcrum at the time when the brake shoe 14 is at work. In other words, the shaft support rod 13 is subjected to a backward thrust when the brake shoe 14 is engaged with the wheel rim, as illustrated in FIG. 2. As a result, the upper segments of the lower fork tubes 12 are acted on by a side thrust and a spin force. In order to stabilize the lower fork tubes 12, a support frame 18 is provided such that the support frame 18 is fastened with the upper segments of the lower fork tubes 12.

Such a shock-absorbing structure of the bicycle front fork as described above is not cost-effective and is rather time-consuming in installing the structure.

SUMMARY OF THE INVENTION

It is therefore the primary objective of the present invention to provide a cost-effective shock-absorbing structure for the bicycle front fork.

It is another objective of the present invention to provide a shock-absorbing structure which can be easily mounted on the bicycle front fork.

In keeping with the principle of the present invention, the foregoing objectives of the present invention are attained by a shock-absorbing structure, which includes two fork tubes each having a projection, two fitting members, and a C-shaped retaining ring.

The foregoing objectives, features and functions of the present invention will be more readily understood upon a thoughtful deliberation of the following detailed description of the present invention with reference to the accompanying drawings.

DETAILED DESCRIPTION OF THE INVENTION

Figure 1:
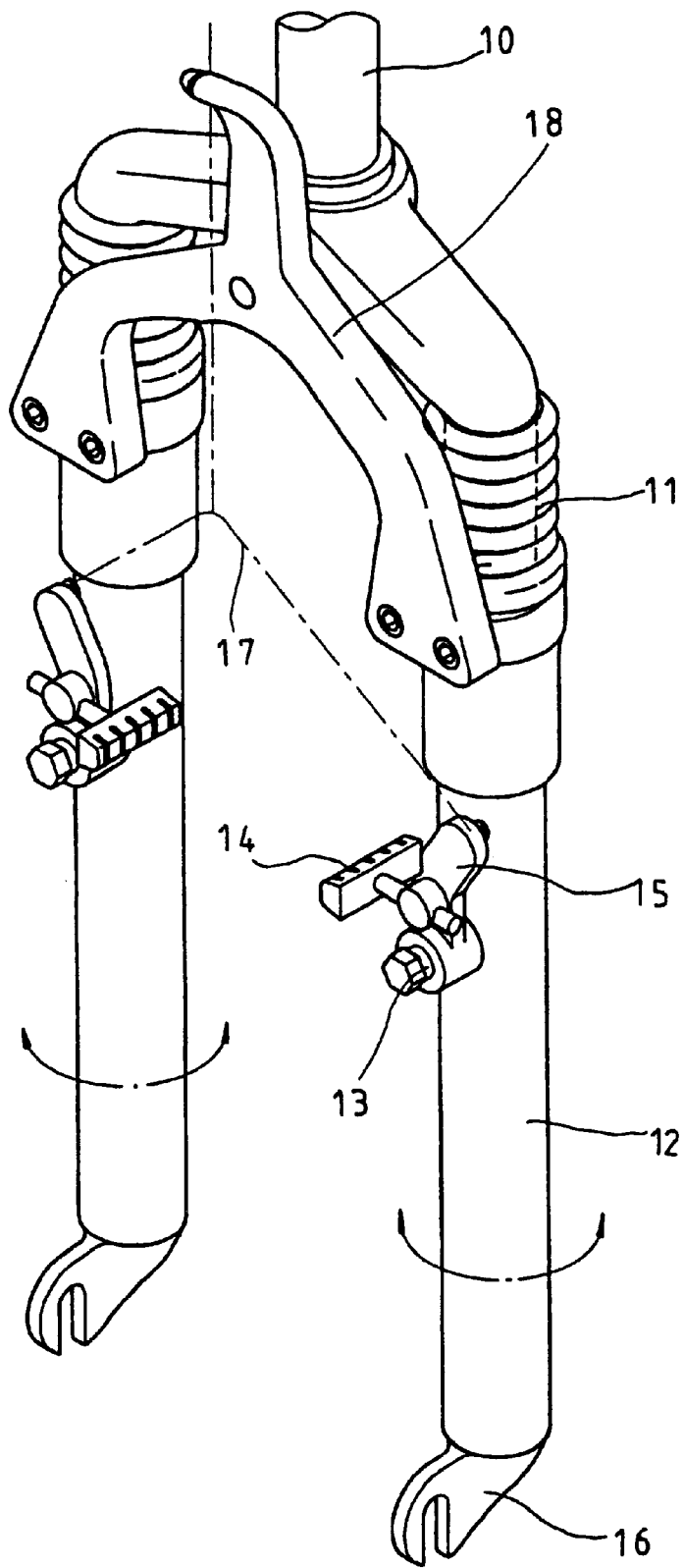
FIG. 1 shows a perspective view of a bicycle front fork shock-absorbing structure of the prior art.
Figure 2:
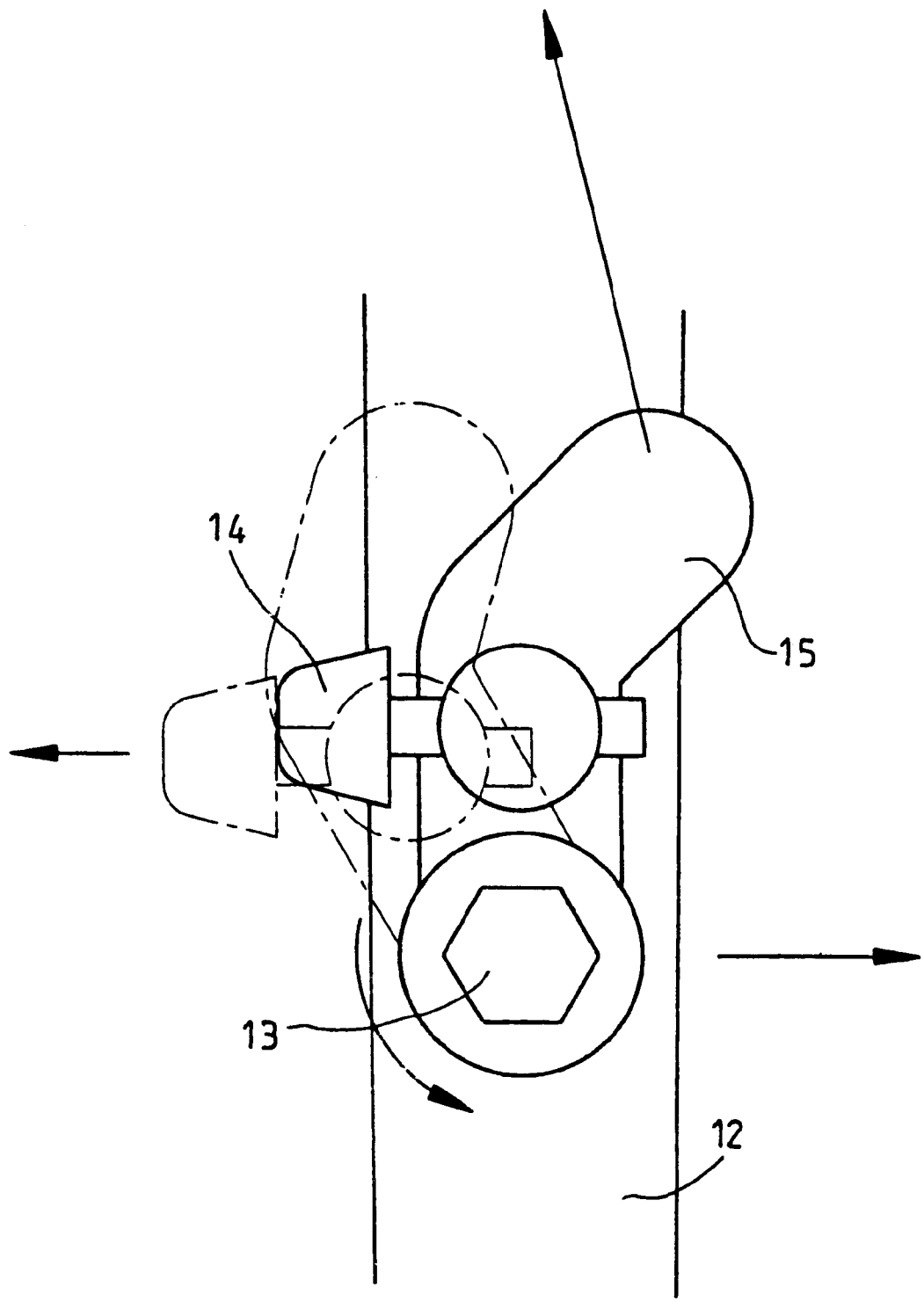
FIG. 2 shows a schematic view of forces exerting on the shaft support rod of the prior art as shown in FIG. 1.
Figure 3:
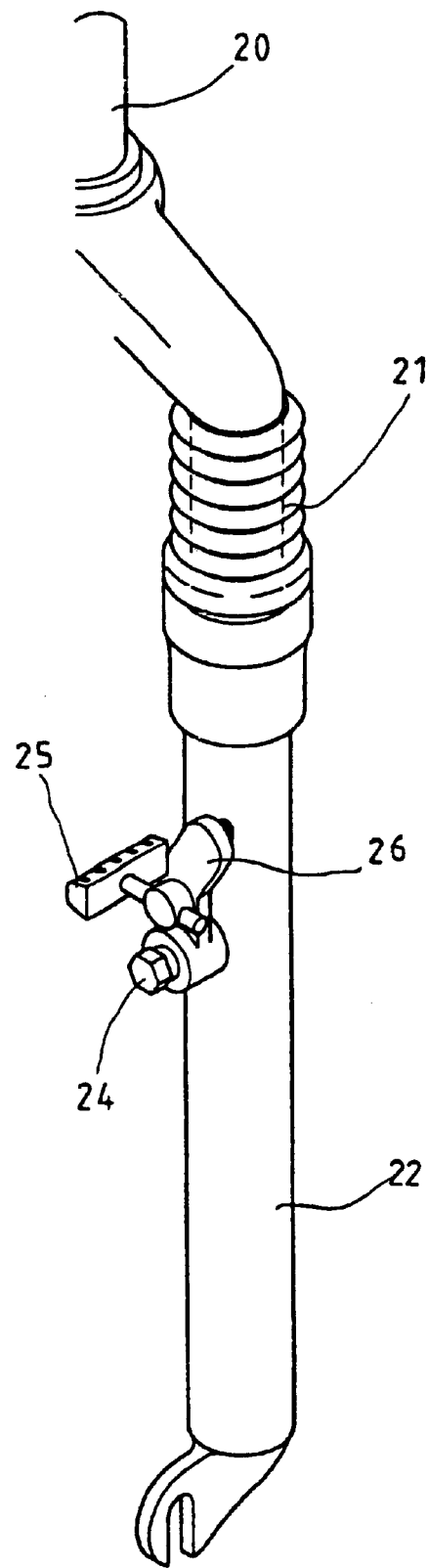
FIG. 3 shows a perspective view of the present invention.
Figure 4:
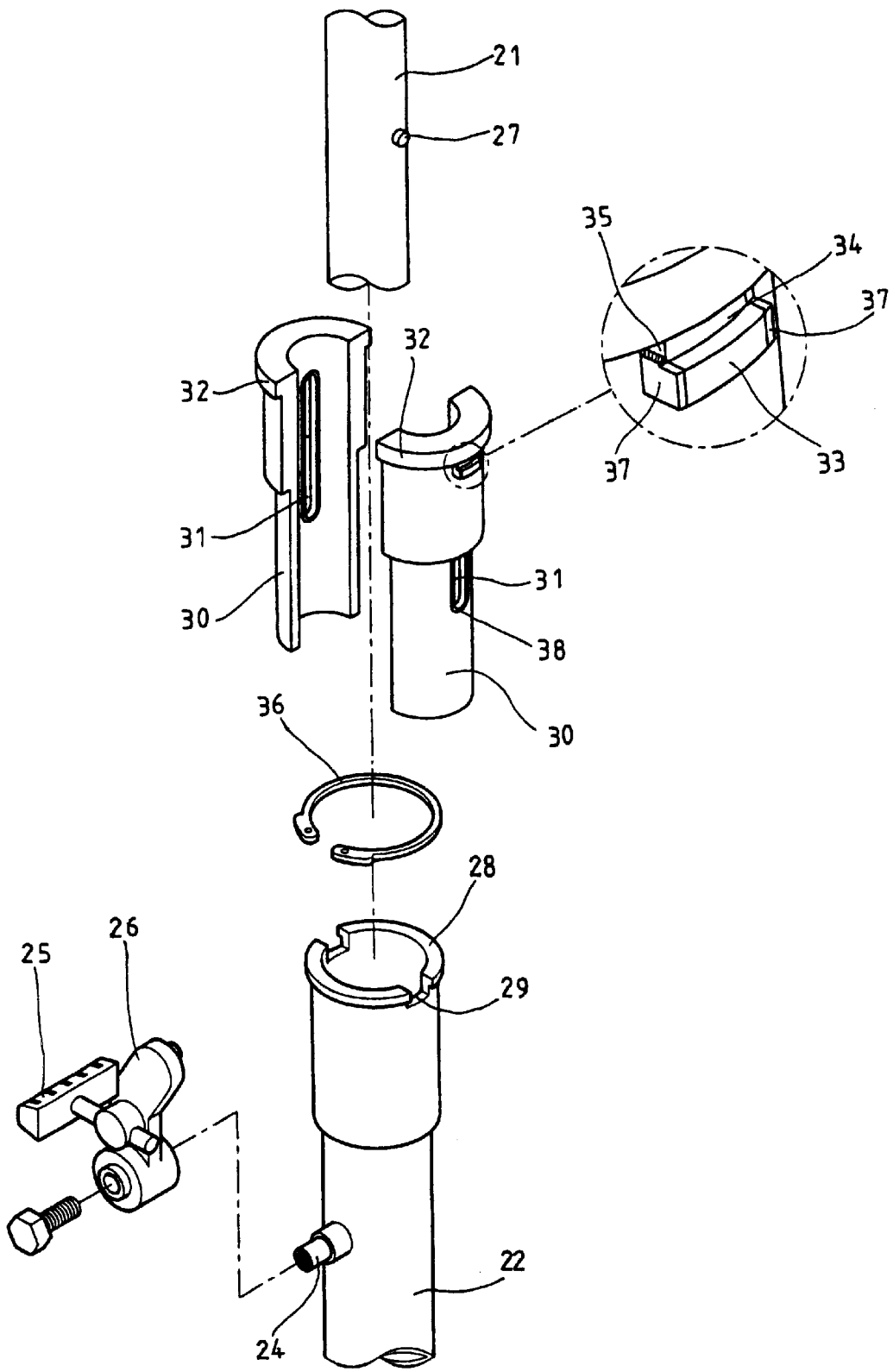
FIG. 4 shows an exploded view of the present invention.

As shown in FIGS. 3–6, a bicycle front fork main body 20 of the present invention is provided at the bottom end thereof with two parallel upper fork tubes 21 each having a midsection which is provided with a fitting member 30. The fitting member 30 is engaged with a lower fork tube 22. The lower fork tube 22 is provided therein with an elastic element 23. A shaft support rod 24 is fastened at the upper section of the lower fork tube 22 for fastening pivotally an arm-holding member 26 which has a brake shoe 25. The present invention is characterized in that the upper fork tubes 21 are provided in the midsection thereof with a projection 27, and that the fitting member 30 is provided in the inner wall thereof with a slide slot 31 which is longitudinally extended and is corresponding in location to the projection 27, and further that the fitting member 30 is provided with a flange 32, a protruded block 33, and a cross insertion groove 34 located between the flange 32 and the protruded block 33 for locating a C-shaped retaining ring 36. The protruded block 33 is corresponding in location to a groove 29 of the stopping ring edge 28 of the lower fork tube 22.

Figure 5:
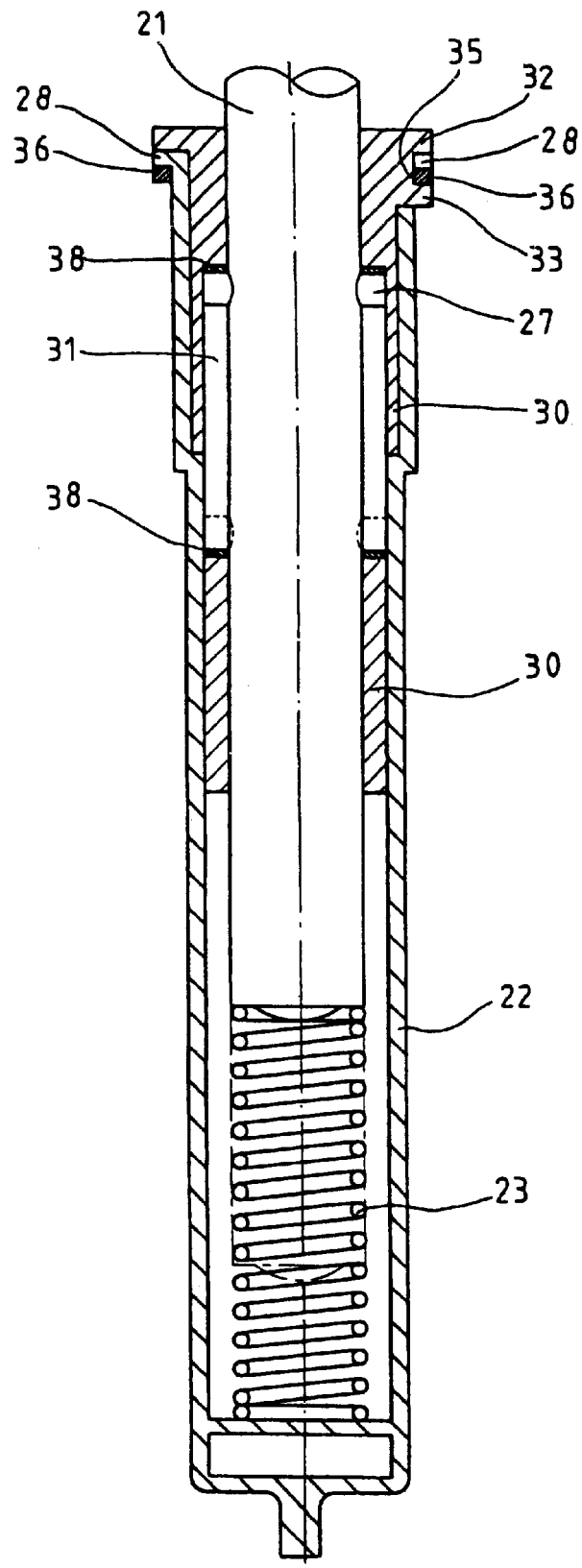
FIG. 5 shows a sectional view of the present invention in combination.
Figure 6:
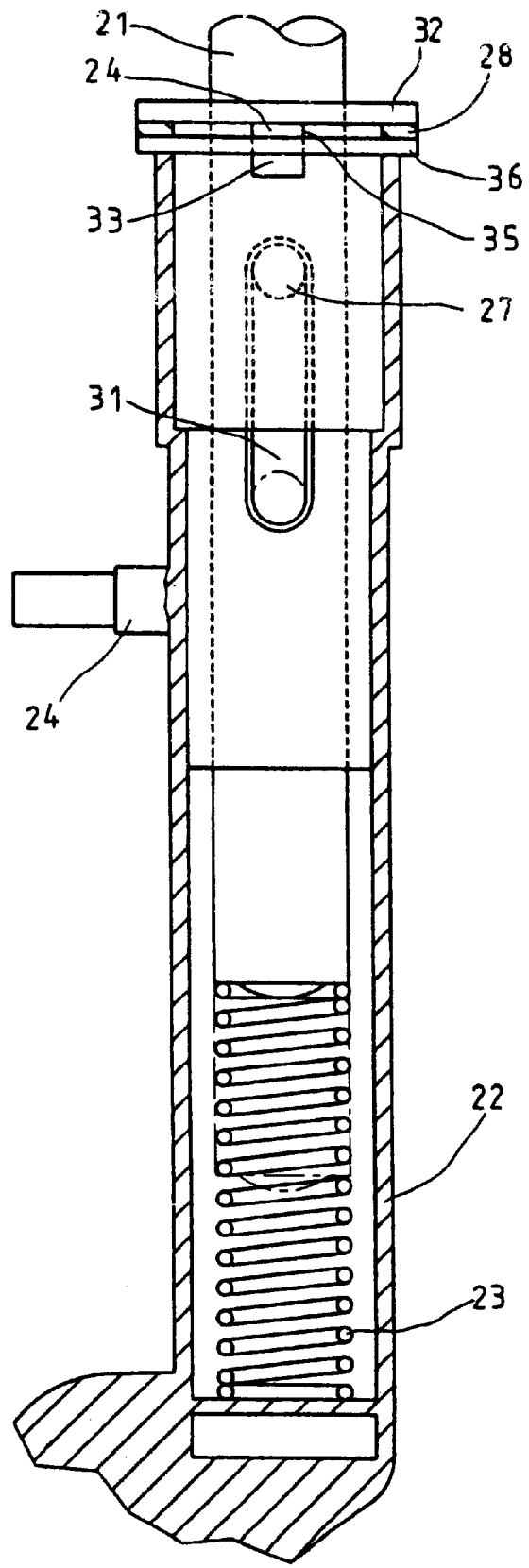
FIG. 6 shows another sectional view of the present invention in combination.

The bottom of the cross insertion groove 34 of the fitting member 30 is provided with an extension portion 35 connecting the flange 32 and the protruded block 33. The cross insertion groove 34 is corresponding in size and thickness to the C-shaped retaining ring 36. The slide slot 31 has a length greater than the length of the retracted upper fork tube 21, as shown in FIGS. 5 and 6. The protruded block 33 and the extension portion 35 of the fitting member 30 are provided with a rigid stop plate 37 in contact with the edge of the groove 29 of the lower fork tube 22. A rigid frame plate 38 is located in the slide slot 31 for eliminating the locating allowance between the fitting member 30 and the projection 27 of the upper fork tube 21.

Figure 7:
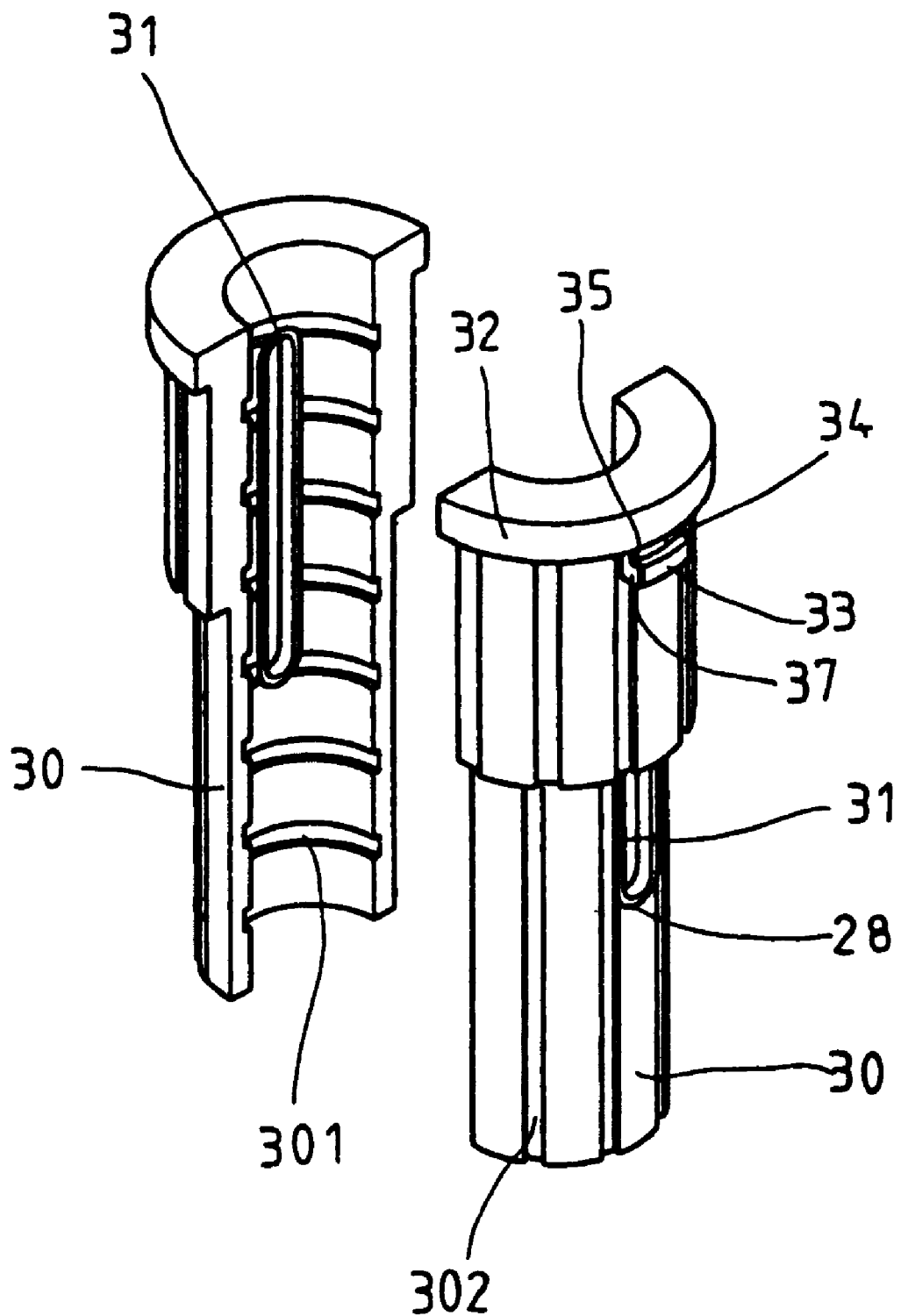
FIG. 7 shows a schematic view of the fitting member of the present invention.
Figure 8:
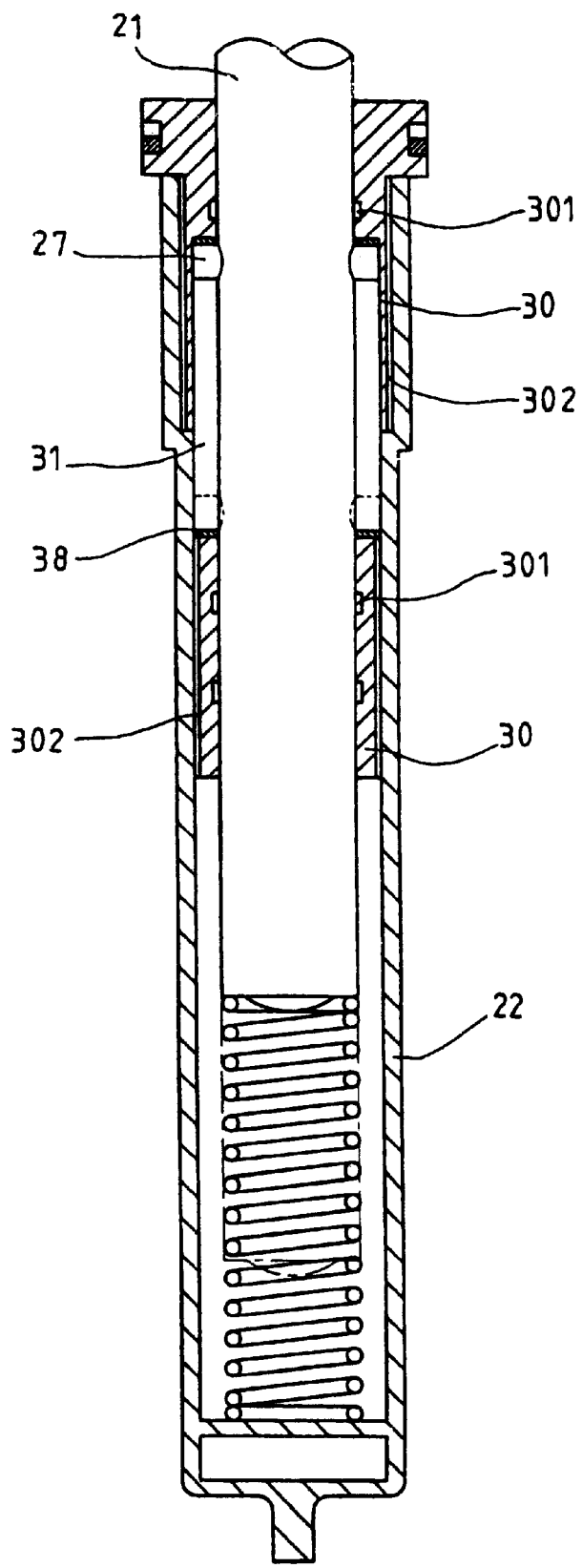
FIG. 8 shows another sectional view of the present invention.

The fitting member 30 may be provided in the inner wall thereof with a plurality of recesses 301 for reducing the contact area between the fitting member 30 and the upper fork tube 21. The fitting member 30 may also be provided in the outer wall thereof with a plurality of allowance slots 302 which are longitudinally oriented to facilitate the engaging of the fitting member 30 with the lower fork tube 22, as shown in FIGS. 7 and 8.

Figure 9:
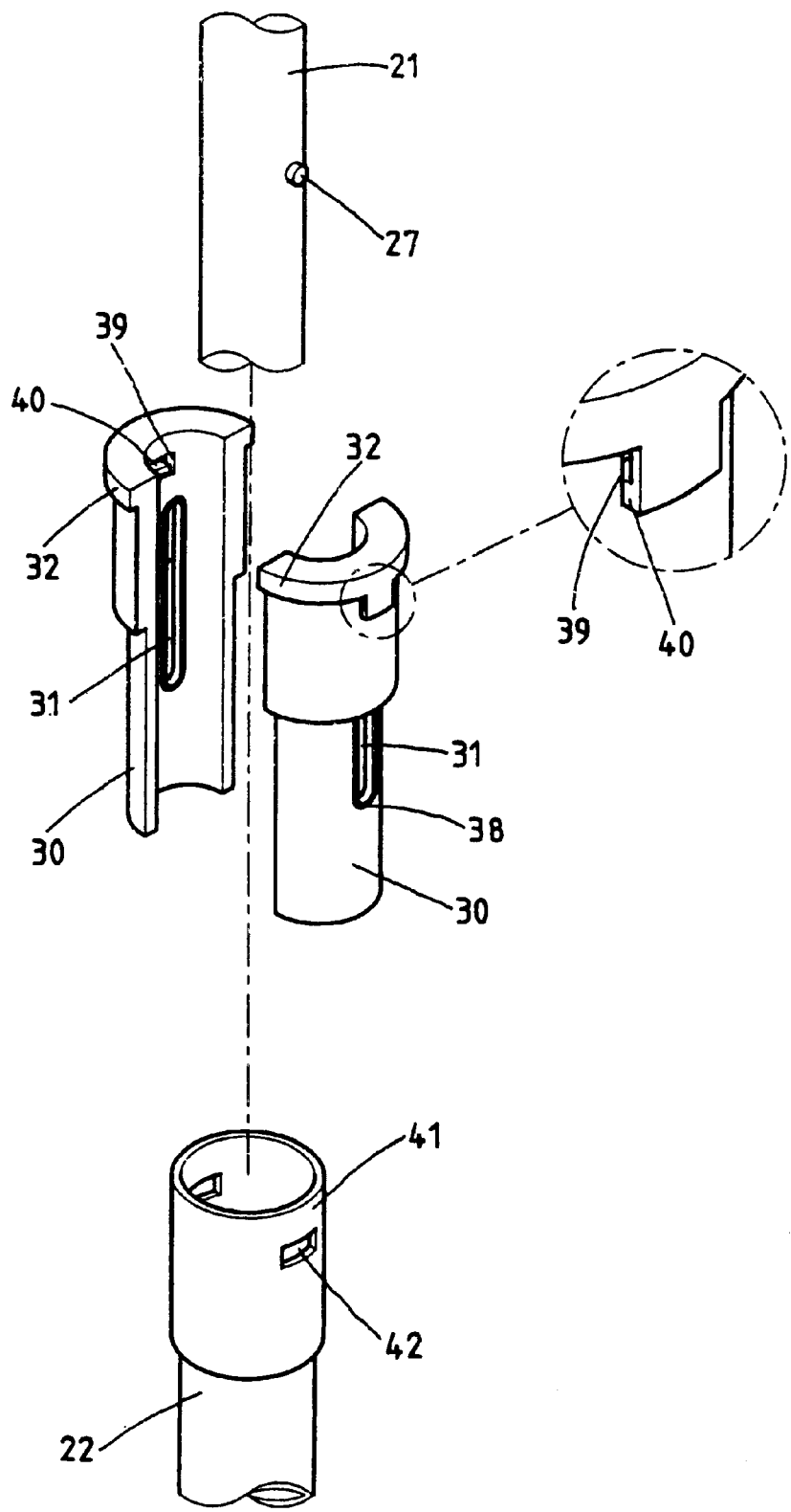
FIG. 9 shows another exploded view of the present invention.
Figure 10:
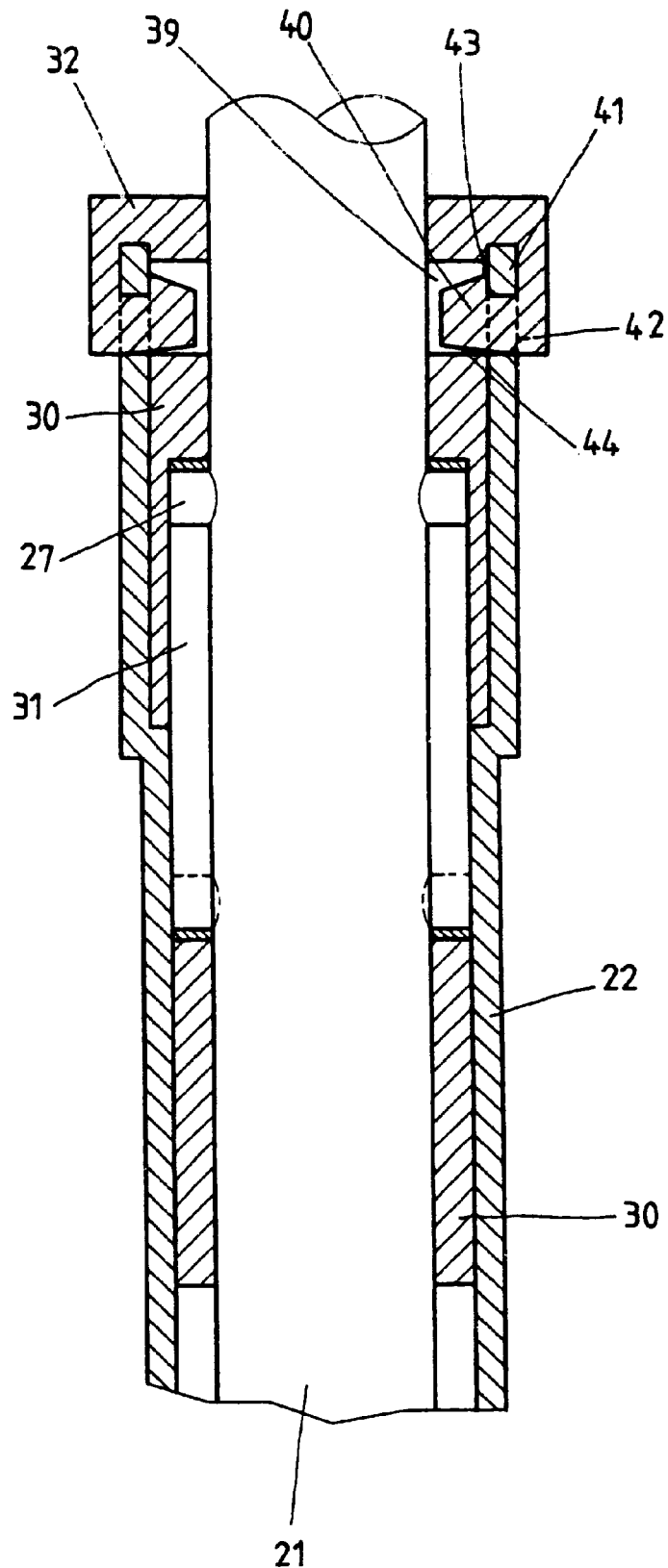
FIG. 10 shows another sectional view of the present invention.

Now referring to FIGS. 9 and 10, the protruded block 33 of the fitting member 30 is replaced by a slot 39. The fitting member 30 is further provided with an insertion protuberance 40 corresponding in location to a retaining slot 42 of a retaining edge 41 of the lower fork tube 22. The insertion protuberance 40 is provided with a retaining edge 43 and a guide edge 44. As a result, the C-shaped retaining ring 36 is eliminated so as to reduce the cost.

In combination, the fitting member 30 is engaged with the upper fork tube 21 and the lower fork tube 22 such that the slide slot 31 of the fitting member 30 is engaged with the projection 27 of the upper fork tube 21, and that the protruded block 33 of the fitting member 30 is engaged with the groove 29 of the lower fork tube 22, and further that the rigid stop plate 37 of the fitting member 30 presses against the groove 29, and still further that the flange 32 of the fitting member 30 is in contact with the stopping ring edge 28 of the lower fork tube 22. The fitting member 30 is further securely engaged with the lower fork tube 22 by the C-shaped retaining ring 36. The shock-absorbing effect of the upper fork tube 21 is attained by the projection 27 which is capable of sliding in the slide slot 3 1 of the fitting member 30. In addition, the elastic element 23 serves to provide the upper fork tube 21 with the shock-absorbing effect. The disengagement of the fitting member 30 with the lower fork tube 22 is averted by the insertion protuberance 40 which is engaged securely with the retaining slot 42 of the lower fork tube 22.

The embodiments of the present invention described above are to be deemed in all respects as being merely illustrative and not restrictive. According, the present invention may be embodied in other specific forms without deviating from the spirit thereof. The present invention is therefore to be limited only by the scopes of the following appended claims.

What is claimed:

1. A Bicycle front fork comprising:

two upper fork tubes;

two lower fork tubes; and two fitting members fastened between said upper fork tubes and said lower fork tubes;

wherein said upper fork tubes are provided respectively in an outer wall thereof with a projection;

wherein said lower fork tubes are provided with a stopping ring edge having a groove; and wherein said fitting members are provided respectively in an inner wall thereof with a slide slot corresponding in location and dimension to said projection of said upper fork tubes, said fitting members further provided in an outer wall thereof with a protruded block, a flange, and an insertion groove located between said flange and said protruded block for locating a C-shaped retaining ring for fastening said fitting member with said lower fork tube.

2. The bicycle front fork as defined in claim 1, wherein said insertion groove of said fitting members is provided with an extension portion connecting said flange and said protruded block of said fitting members.

3. The bicycle front fork as defined in claim 2, wherein said protruded block and said extension portion are provided respectively with a stop plate pressing against said groove of said lower fork tubes; and wherein said slide slot of said fitting members is provided in an inner wall thereof with a frame plate for eliminating a locating allowance of said slide slot and said projection of said upper fork tube.

4. The bicycle front fork as defined in claim 1, wherein said fitting members are provided respectively in an inner wall thereof with a plurality of recesses for reducing the contact area between said fitting members and said upper fork tubes; and wherein said fitting members are provided respectively in an outer wall thereof with a plurality of allowance slots to facilitate the engaging of said fitting members with said lower fork tubes.

5. The bicycle front fork as defined in claim 1, wherein said fitting members are provided respectively in an outer wall thereof with a slot in place of said protruded block, and an insertion protuberance which is provided with a retaining edge and a guide edge; and wherein said lower fork tubes are provided respectively with a retaining slot.

* * * * *